United States Patent

[11] 3,540,414

| [72] | Inventor | Raymond Maloney, Jr.<br>32 Bamboo Terrace, Key West, Florida 33040 |
|---|---|---|
| [21] | Appl. No. | 787,689 |
| [22] | Filed | Dec. 30, 1968 |
| [45] | Patented | Nov. 17, 1970 |

[54] METHOD AND APPARATUS FOR REARING CRUSTACEANS
23 Claims, 10 Drawing Figs.

[52] U.S. Cl.................................................. 119/2
[51] Int. Cl................................................. A01k 61/00
[50] Field of Search....................................... 119/2, 3, 5

[56] References Cited
UNITED STATES PATENTS

| 2,984,207 | 5/1961 | Drake............................ | 119/2 |
| 3,086,497 | 4/1963 | Novello.......................... | 119/2 |
| 3,473,509 | 10/1969 | Miyamura....................... | 119/2 |
| 3,477,406 | 11/1969 | Fujinaga......................... | 119/2 |

Primary Examiner—Aldrich F. Medbery
Attorney—Dominik, Knechtel & Godula

ABSTRACT: Phototropic Decapoda crustacea are reared through all larval stages by a method whereby larvae are induced to migrate from one rearing chamber to an adjoining rearing chamber by steps of initial movement away from communicating passageways so they can be opened, and then moving through such passageways. The larvae are urged towards alignment with the passageways by using isolated rays of light. A tank has adjoining rearing chambers separated by a partition wall containing a plurality of communicating passageways. A mountable hood, having spaced light sources, can close the open top of a chamber. A transfer cover has a plurality of openable ports along one edge for alignment with the communicating passageways.

Patented Nov. 17, 1970 3,540,414
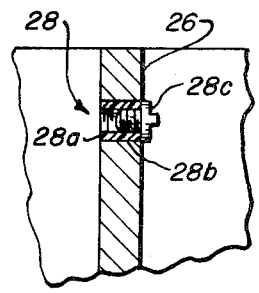
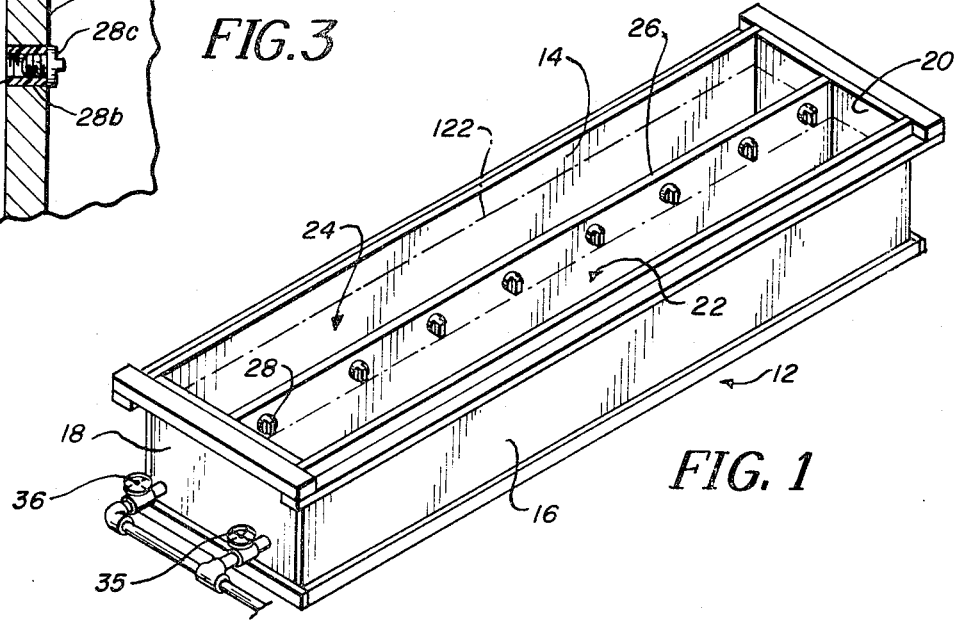
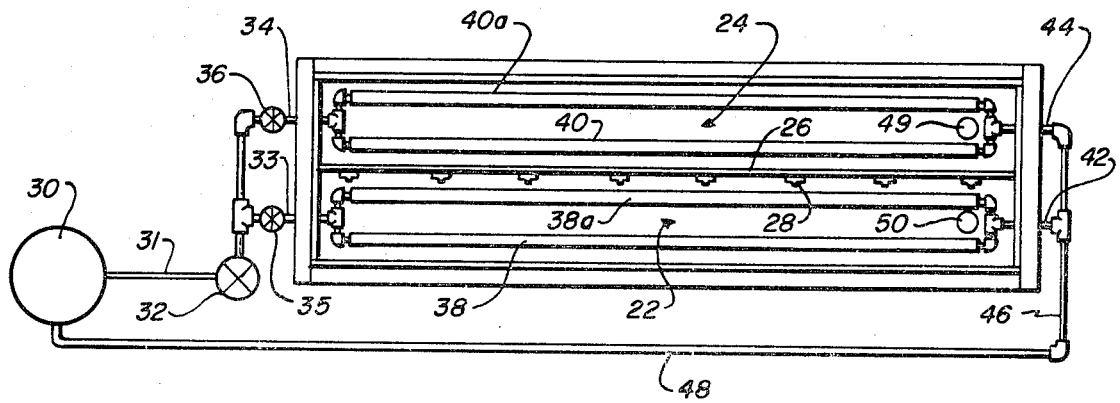
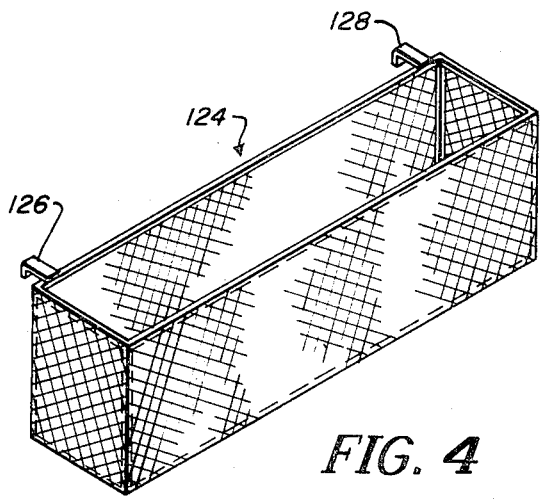
INVENTOR
RAYMOND MALONEY Jr.
BY
Dominik, Knechtel & Godula
ATTYS.

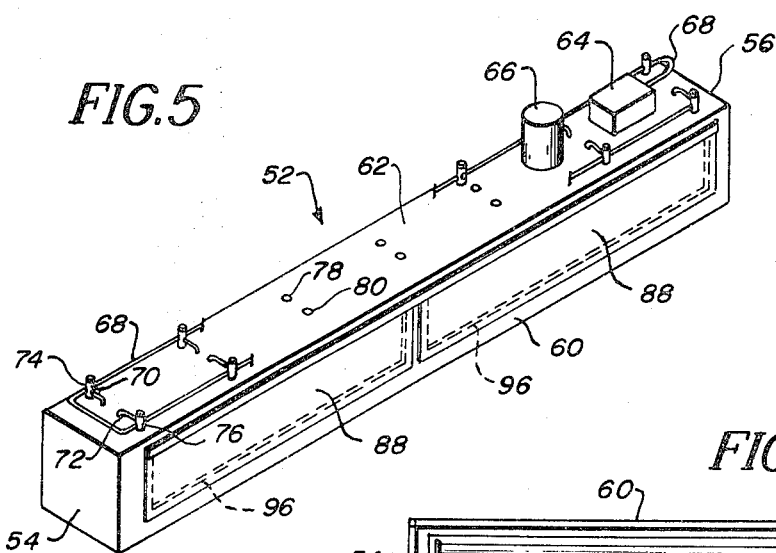
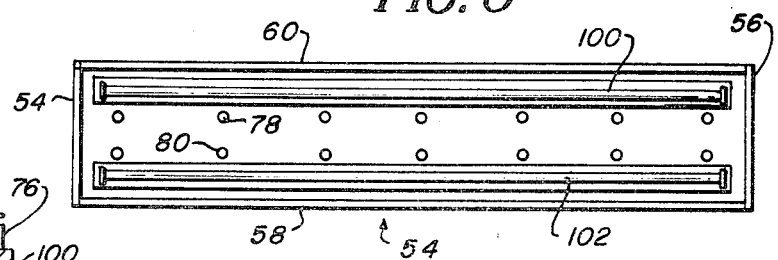
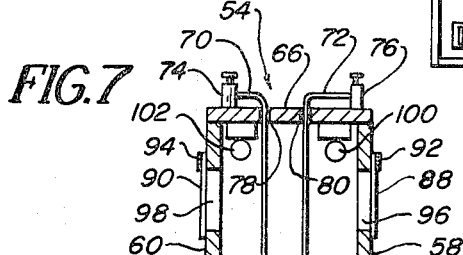
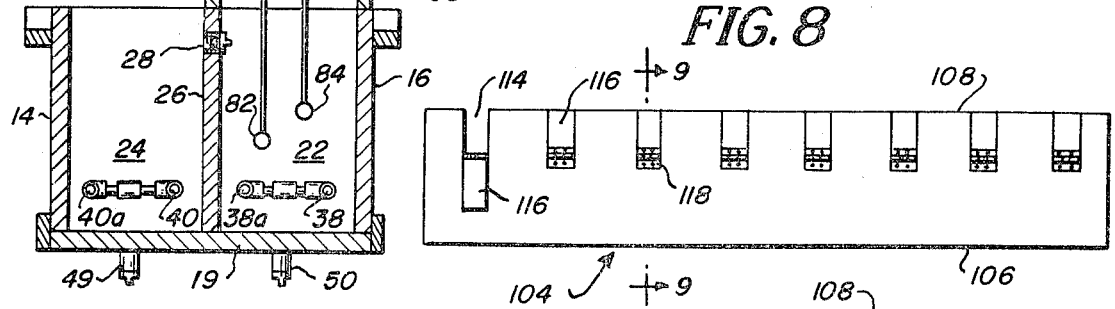
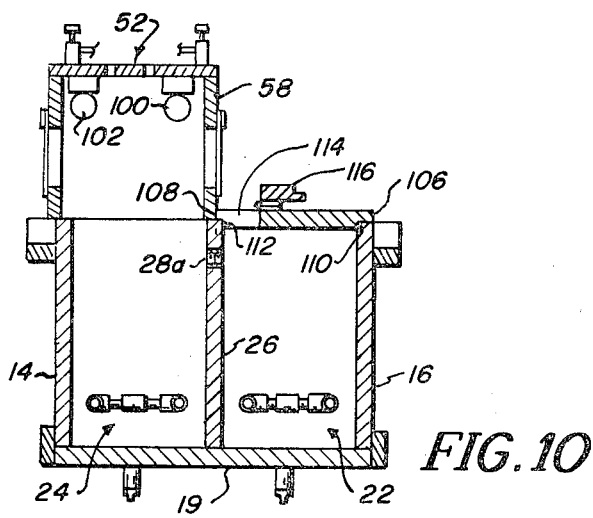
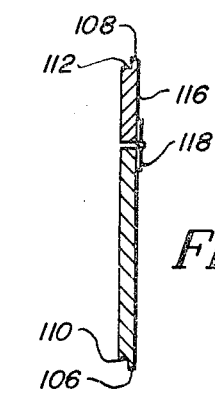
INVENTOR
RAYMOND MALONEY Jr.
BY
ATTYS.

METHOD AND APPARATUS FOR REARING CRUSTACEANS

This invention relates to a method and apparatus for rearing crustacea larvae, in particular, for rearing Decapoda crustacean larvae, such as pink shrimp, spiny lobster, and stone crabs to at least early postlarval stage.

Efforts to rear crustacea have not attained desired levels of success in the art, such efforts being plagued by uncommonly high losses of the larvae, difficulty in maintaining rearing chambers free of objectionable levels of contaminates, and difficulties in maintaining the required controls over conditions such as temperature and aeration. It has been recognized in the art that commercially important crustacea such as pink shrimp, spiny lobster, and stone crab larvae, respond positively to natural or artificial light, that is, they exhibit phototropism. It is desirable to utilize this phenomenon as an aid to rearing these crustacea larvae to a sufficiently developed stage of growth. Some attempts have been made to use this vital response to advantage. Brine shrimp or Artemia salina show this response as disclosed in U.S. Pat. No. 2,984,207 and U.S. Pat. No. 3,086,497. Some limited success may be realized in hatching and separating such brine shrimp, but different problems are encountered in attempting to hatch and to rear the Decapoda order crustacea such as the pink shrimp, spiny lobster and stone crab. The art has acknowledged the difficulties involved by the small numbers of such larvae which are reared to the early postlarval stage.

It has been recognized that difficulty has been encountered in the rearing of pink shrimp or penaeid through the protozoeal stages. Such observation has been made by J.J. Ewald in the bulletin of "Marine Science" Volume 15, No. 2, pages 436—449 (June, 1965). One of the recognized problems is that the protozoeal larvae suffer high losses in the presence of contaminates in the body of liquid in which they are being reared. Such contaminates may comprise a variety of materials including food, fecal materials, bacteria and still other materials. It is believed that the larvae or protozoea become entangled in such contaminates and sink to the bottom of a rearing tank and die. It is therefore evident that it is desirable to provide an improved means whereby liquid volumes compatible for rearing crustacea may be changed in an efficient and improved manner without causing serious larval losses.

It is recognized in the art that any hopes for success in the rearing of crustacea requires controlled conditions of temperature in the liquid bath, aeration and quality of the liquid in order to obtain the requisite compatibility for rearing the crustacea. Sea water, such as gulf stream or Florida current water, has been recognized as an acceptable liquid body for this purpose. It is therefore desirable to obtain a method and apparatus whereby means may be provided for efficient introduction of fresh supplies of uncontaminated liquid volumes while still enjoying efficient dispositions of means to aerate and to control the temperature of the liquid.

In view of the foregoing, it will be appreciated that one important object of the present invention is to provide a method and apparatus in which phototropic Decapoda crustacea may be hatched and reared in improved manner to obtain sufficiently larger numbers of larvae in at least the early postlarval stages.

Yet another important object of this invention is to provide a method and apparatus whereby commercially desirable crustacea such as pink shrimp, spiny lobster and stone crab may be 4 reared under more efficient conditions to obtain larger numbers of these species in at least the early postlarval stages for later cultivation to the adult stage.

Still another important object of the present invention is to provide a method and an apparatus whereby the vital response of phototropism in the Decapoda crustacea is realized to advantage to more efficiently transfer Decapodal crustacea from one rearing chamber to an adjoining rearing chamber.

In the accomplishment of objects such as the foregoing, as well as still other objects which will occur to practitioners from time to time, it is now provided that phototropic Decapoda larvae are induced to transfer or migrate from one rearing chamber to another rearing chamber in a highly efficient manner so that very high numbers of the originally spawned eggs may be removed from the chamber having the contaminated liquid. Such liquid may then be removed and fresh liquid introduced to receive large numbers of larvae from the adjoining chamber when the liquid of said adjoining chamber reaches objectionable levels of contamination.

The advantages realized by the present invention will be better appreciated by referring to the following detailed disclosure, which includes drawings wherein:

FIG. 1 is a perspective view of the tank with adjoining open top chambers for use in the rearing the described crustacea;

FIG. 2 is a top plan view on a slightly reduced scale, of the tank indicated in FIG. 1, with means indicated somewhat diagrammatically for controlling the temperature of the liquid volumes in the rearing chambers of the tank;

FIG. 3 is a portional view, on an enlarged scale, showing, in section, a communicating passageway and closure in a partition wall between adjoining chambers in the tank;

FIG. 4 is a perspective of a foraminous basket utilized in the process of rearing crustacea such as pink shrimp so that the eggs may be separated from the spawning female;

FIG. 5 is a perspective view of an incubator hood used in associating with the tank of FIGS. 1–3;

FIG. 6 is a bottom plan view of the incubator hood of FIG. 5;

FIG. 7 is a sectional view of an incubator hood mounted on one of the rearing chambers in the tank, taken along a plane parallel to the opposite ends thereof;

FIG. 8 is a top plan view of a transfer cover which is positionable to close the open end of a rearing chamber in a tank;

FIG. 9 is a sectional view along line 10–10 of FIG. 9 and

FIG. 10 is a sectional view through the tank, incubator hood, and transfer cover, taken along a plane parallel to the opposite ends of the structures.

Referring first to the drawings the tank shown generally as 12 is an elongated generally rectangular structure with sidewalls 14, 16, and opposite end walls, 18, 20. Within the tank are a pair of adjoining rearing chambers 22 and 24, such chambers being separated by a partition wall 26. The upper part of the partition wall 26 has a plurality of communicating passageways with removable closures, one of which is indicated at 28.

Looking at FIG. 3, each communicating passageway is formed by a threaded sleeve 28a which is bonded in a somewhat cylindrical passageway 28b with a strong agent such as epoxy cement. The threaded sleeve is removably stoppered by threaded closure plug 28c. The illustrated plug has a conveniently positioned finger grasping flange as shown.

The liquid volume which is deposited in the rearing chambers, preferably filtered sea water, has its temperature controlled within the desired limited ranges by means such as the illustrated hot–cold water circuit. The heating or cooling medium is delivered from a source or reservoir 30 into line 31 where it is moved by circulating pump 32 into rearing chamber entry lines 33 and 34. Manual valve means 35 and 36 may be provided to control entry of the heating or cooling medium into the pipes within the rearing chambers of the tank.

The heating or cooling medium is diverted into branch lines in each chamber such as 38 and 38a in rearing chamber 22; and branch lines 40 and 40a in rearing chamber 24. The foregoing lines convey heating and cooling mediums, and are branches of a loop in each rearing chamber. The loops join an outlet line 42 from rearing chamber 22, and an outlet line 44 from rearing chamber 24. Both outlet lines empty into common line 46 which communicates with return line 48 back to the source or reservoir 30. It is to be understood that the view of FIG. 2 is somewhat diagrammatic with respect to the lines, the controls and the reservoir. A single source or reservoir has been indicated, but it should be understood that in the preferred embodiment, the source may include a separate hot water heater joined to feed line 31 and return line 48, and a separate cooler likewise joined to these lines. The flow of the cooling or heating medium is controlled by sensing and control means which will be later indicated and described.

The tank has a common floor 19 for both rearing chambers and drains 49 and 50 are preferably mounted in the floor portions of the respective chambers. Such drains may have a construction similar to the communicating passageways 28 in the partition wall 26. A threaded closure may be removed to empty the rearing chambers of the liquid volumes deposited therein.

The tank is used in conjunction with an incubator hood shown generally at 52 in the views of FIGS. 5—7. This incubator hood is likewise elongated and rectangular with opposite end walls 54 and 56, and opposite sidewalls 58 and 60. A top wall 62 has mounted thereon a thermoregulator relay 64 to sense the temperature within the rearing tanks and to control the flow of heating or cooling medium from the source or reservoir 30. Also mounted on the top wall is an air pump 66 which may deliver pressurized air through common line 68 into paired branch lines such as 70 and 72 spaced along the length of the top wall of the incubator hood. Each pair of branch air lines are joined to valves such as 74 and 76 which control the rate of air delivered to the branch line. The branch line pass through spaced apertures 78 and 80 in the top wall 62 of the incubator hood. These lines extend downwardly a distance sufficient so that their ends are well below the water level of the liquid volume in the underlying rearing tank. Means to diffuse the air, such as air stones 82 and 84, are provided at the ends of the branch lines. The thermoregulator relay and air pump have the usual electrical connections and controls which are not described because they do not, as such, comprise a part of the invention.

The opposite sidewalls of the incubator hood are illustrated as transparent plastic covers 88 and 90 opposite sides. These plastic covers are resilient and are secured along their top edge to the sidewalls by members 92 and 94. The bottom edges are free and may be moved away from their respective sidewalls to provide access through elongated openings 96 and 98 in the opposite sidewalls. With such access means, food and spawning females may be delivered into the tank with the hood in place. The incubator hood will completely close the open top of a chamber in the tank because the width between sidewalls 58, 60 is about the same as the width between partition wall 26 and a sidewall 14 or 16.

The underside of the top wall 62 of the incubator hood is provided with a pair of spaced artificial light fixtures, which, in the illustrated form, are elongated electric fluorescent tubes 100 and 102. These spaced sources of artificial light are separately controlled so that either of the bulbs or both bulbs may be actuated. The electrical connections and switches are conventional and are not described. The sequence of actuating these artificial light sources will be described later in relation to the description of a method of rearing the crustacea.

The tank and incubator hood are intended to be used in conjunction with a transfer cover shown generally as 104. The elongated transfer cover has opposite side edges 106 and 108, each of which has an angular undercut 110 and 112. The undercuts form shoulders which contact the top edges of a sidewall of the tank and the partition wall of the tank. Thus a type of unsecured rabbet joint is obtained. The dimension from the side 106 to side 108 of the transfer cover is selected so that cover is positionable to close the open end of an underlying rearing tank, as indicated in view of FIG. 10. Side 108 preferably terminates about one-half the width of partition wall 26 so that space is left at the top edge of said partition wall to accommodate one-half the thickness of the bottom edge of sidewall 56 of the incubator hood.

The transfer cover has a plurality of ports in the form of rectangular cutouts along edge 108, one of said cutouts being indicated at 114. Each rectangular port is opened and closed by a trap door, one of which is shown at 116. Such a trap door is hinged at 118 to the transfer cover 104 so that the trap door may be raised upwardly and moved about 180° to full open resting position as seen in the view of FIG. 10. Each of the ports of the transfer cover will be aligned with a communicating passageway 28 when the cover is fully mounted to close the opening of a rearing chamber.

In the preferred form, the interior area of a rearing chamber is coated black throughout a major portion thereof. In particular, the inside floor portion 19 is entirely black and the major portion of the inside sidewalls 14 and 16 and the inside end walls 18, 20 are painted black from the floor towards the upper edges thereof. An upper minor portion of the insides of the rearing chamber walls are provided with a contrasting light color such as white. The demarcation between the black coat and the contrasting lighter coat is indicated by the broken line 122 in the view of FIG. 1. Such contrasting colors help to induce congregation of the larvae towards the top of the tank.

A foraminous open top basket, shown generally at 124 in the view of FIG. 4, may be used to assure successful spawning of the eggs of some crustacean species such as pink shrimp. With such species, it is desirable to separate the eggs from the predatory attacks of the female. The foraminous basket has mesh openings sufficiently large to permit the eggs to pass therethrough but sufficiently small to retain the female in the basket. Such baskets are elongated and somewhat rectangular in structure, and have a dimension between their opposite elongated sidewalls sufficient to allow such baskets to be introduced into a rearing chamber between a sidewall such as 14 or 16 and the partition wall 26. Hanging brackets 126 and 128 are provided for hooking to the top edge of a sidewall 14 or 16 of the rearing chamber. Following spawning, such foraminous basket, with the females constrained therein, is removed from the rearing chamber.

In the practice of the method, the rearing chambers are well cleaned with a detergent solution such as Alconox in water. The communicating passageways 28 are stoppered with closures 28c. Sea water is filtered through means such as Dacron material within a housing, and such filter cleaned sea water is preferably introduced into rearing chamber 22 by conduit or the like passing through elongated opening 96 in sidewall 58 of the incubator hood. The chamber 22 is filled almost to the top edges of sidewall 16 and partition wall 26. This high liquid level helps to hold dust from passing into rearing chamber 24 during a later transfer step. The incubator hood is mounted on the rearing chamber to prevent dust or other contaminates from entering the rearing chamber of the tank. The temperature sensing and control means are then activated to maintain temperature in the tank close to the desired level of 28.8°C. The incubator hood is then removed and the foraminous basket 124 is hung on the top edge of the sidewall 16.

One or more gravid female pink shrimp are deposited in the basket and retained therein until spawning is substantially completed. The spawned eggs pass through the basket and settle on the floor portion of the tank, and such eggs are deposited in sufficient number so as to be readily observable. The basket with the females constrained therein is removed, and an incubator hood is positioned therein to close the open end of rearing chamber 22.

Lights 100 and 102 are turned on, air pressure is delivered through the branch lines and diffused through the air stones within the body of sea water. The transparent plastic covers or dust shields are maintained in closed position to prevent dust entry, and such shields are opened only for feeding or checking the temperature of the liquid volume of the chamber. Within 15 to 20 hours, the eggs are hatched to the larval stage. The larvae are retained in rearing chamber 22 until the first protozoeal stage is reached, in about 36 to about 40 hours. Feeding of the larvae is commenced after about 25 hours following hatching, or during the fourth and fifth nauplius stage. Several foods may be used, but it is preferred to use live Artemia salina or brine shrimp after the first mysis stage is reached. Such brine shrimp are distributed evenly over the surface of the liquid volume in the rearing chamber.

The larvae are retained in rearing chamber 22 for about 6 to 8 hours following the feeding period. Rearing chamber 24 is then filled with filtered sea water in the same way as chamber 22 was filled. The temperature of the deposited body of sea water is then brought to the same level as the temperature of the sea water in the rearing chamber 22, that is, about 28°C.

Fluorescent light 102 in the incubator hood is then turned off. This is the light proximal to the partition wall 26. Light 100, or the light distal to the partition wall 26, is left on. The distal light will attract the larvae towards the sidewall 16, and most or all of the larvae will have migrated towards the sidewall 16 within about one-half hour. The transfer plugs 28c are then removed, preferably by a plastic wrench. The plugs may be removed manually following careful washing of the hands with a detergent solution.

After removal of the closure plugs, the distal or outside light is turned off, and the proximal or inside light is turned on. This proximal light will induce the migration of some larvae from rearing chamber 22 into adjoining rearing chamber 24. Following this initial partial migration of larvae, incubator hood 52 is removed from rearing chamber 22 and is mounted on adjoining rearing chamber 24. A transfer cover 104 is then mounted to partially close the open end of rearing chamber 22. It is preferred that the transfer cover be initially positioned to cover about three quarters of the area from the outside sidewall 16 towards the partition wall 26, that is, a gap of about one quarter the area between the partition wall and the outside wall 16 is left between the edge 108 of the transfer cover and the partition wall 26. The gap will allow natural light or synthetic room light or the inside light in the incubator hood to enter the smaller area and induce larvae to migrate towards the communicating passageways 28. The transfer cover partially covers the open end of chamber 22 for about 30 minutes. The open end is then fully covered by the transfer cover, and the plurality of alignment trap doors 116 are fully opened. Room light moving through the open ports will induce substantially all of the larvae remaining in the rearing chamber 22 to align themselves with the communicating passageways 28. After about 15 minutes, the trap doors are closed and rearing chamber 24 is maintained in darkness for several hours. Both lights 100 and 102 in the incubator hood are then turned on to induce substantially complete migration of the larvae from rearing chamber 22 into rearing chamber 24.

Incubator hood 52, mounted on rearing chamber 24, will have light 100 in the proximal position with the partition wall 26 and light 102 in the distal position to partition wall 26. The proximal light is turned off and the distal light is kept on so that the larvae in rearing chamber 24 can now migrate towards the outside or distal sidewall 14. This will allow reinsertion of the closure plugs 28c in the communicating passageways 28. The drain hole 50 at the bottom of rearing chamber 22 is then opened to remove the liquid volume with its contaminates. Rearing chamber 22 is then refilled with fresh filtered sea water, and brought up to the desired temperature levels by the controls and sensing means.

It is preferred to transfer substantially all the larvae from one rearing chamber to the adjoining rearing chamber at about daily intervals so that the contaminates may be removed with the body of liquid from the rearing chamber, and clean filtered sea water may be introduced to replace the former volume. The transfer of larvae and the replacement of liquid volumes compatible to rearing the crustacea is continued at least until the first postlarval stage is reached, within about 10 to 12 days. When the postlarvae attain the desired developmental growth, in about 20 days following hatching, they may be transferred out of the rearing tank to other tanks for continued development.

TABLE I.—"PINK SHRIMP"

| Days | Time | Stage | Temperature, °C. | Food | Remarks |
|---|---|---|---|---|---|
| 0 | 1500 | Gravid female placed in Chamber 22. | 27.5 | | |
| 0 | 2000 | Eggs laid | 27.5 | | |
| 1 | 1100 | 1st naupilus | 27.0 | | |
|   | 1635 | | 28.7 | | |
|   | 2245 | | 28.0 | | |
| 2 | 1240 | | 27.0 | | |
| 3 | 1300 | 1st Protozoea | | 55 dr. wardleys | |
|   | 1600 | | 28.0 | | |
|   | 2130 | | 28.0–29.0 | | Transfer. |
| 4 | 1830 | 1st Protozoea | 28.0 | 75 dr. wardleys | |
|   | 2130 | | | | |
| 5 | 1230 | 1st Protozoea | 28.2 | | |
|   | 2400 | | 28.5 | 75 dr. wardleys | |
| 6 | 1130 | 2d Protozoea | 28.0 | | |
| 7 | 2150 | | 28.5–29.5 | 60 dr. wardleys | Transfer. |
| 8 | 1445 | 3d Protozoea | 28.0 | | |
|   | 2315 | | 29.5 | 60 dr. wardleys | |
| 9 | 0740 | | 29.0 | | |
|   | 1230 | | 30.0 | | |
|   | 1750 | 3d Protozoea | 30.6 | | |
|   | 1950 | | 30.6 | 60 dr. wardleys | |
|   | 2100 | | 29.5 | | |
| 10 | 2110 | 1st Mysis | 30.6 | Live brine shrimp | |
| 11 | 1230 | | 29.0 | | |
|   | 2400 | 2d Mysis | 29.3 | | |
| 12 | 0745 | | 29.0 | | |
|   | 1215 | | 29.0 | | |
|   | 2130 | | 29.0 | | Transfer. |
| 13 | 0730 | | 29.0 | | |
|   | 1220 | 3d Mysis | 29.3 | | |
|   | 1630 | | 30.0 | | |
|   | 2130 | | 30.0 | | |
| 14 | 1800 | 1st Postlarvae | 30.0 | | |

The transfer to an adjoining chamber, which has fresh filtered sea water, may be executed at longer intervals than daily, depending on the observable contamination of pollution of the volume of liquid within the rearing chamber. In following tables I and II there is presented a 14 day rearing schedule with the Decapoda crustacea, Penaeus duorarum or pink shrimp. Table I shows that three transfer operations are performed in rearing the pink shrimp to the first postlarval stage. The temperature of the liquid bath fluctuates to a greater extent in table I then in table II because the automatic sensing relay temperature control was introduced in the course of the study reported in table II. Live brine shrimp were introduced as the food when the first mysis stage was reached in the development of the larvae. Five transfer operations were performed in the rearing operation of table II, and the automatic sensing and control of the temperature began operating on the fourth day following hatching.

Recognized stages characterize the development of the larvae. Following hatching, a naupilus stage lasts about 40 hours, during which the larvae do not feed. A protozoeal stage follows which lasts from about six to about eight days. The motive powers of the larvae are feeble during this stage, and particularly susceptible to attrition. At this stage, small fry fish food is employed as the food, although diatoms may also be used. A food supplied under the trade designation of Wardley's has been found acceptable. The next stage is the mysis stage, and the larvae may be fed artemia or brine shrimp. Various mysis developments lead to the postlarval stage.

The method described allows a much larger number of larvae to survive and reach the early postlarval stage. This understandably increases the yield from the original spawned eggs which leads to commercially greater numbers of adult crustacean following subsequent cultivation in outside tanks. A greater yield is obtained because of the more successful inducement of migration and the transfer operation with resulting substantially smaller losses of larvae.

The invention may now be practiced in the various ways which will occur to practitioners, and it should be understood that all such practice will comprise a part of the present invention so long as it comes within the terms of the following claims as given further meaning by the language of the preceding disclosure.

I claim:
1. A method for rearing crustaceans to the postlarval stage in a rearing tank wherein liquid volumes compatible for rearing crustaceans at preselected temperature levels are present in separated and adjacent rearing chambers, including the steps of:
   covering a first rearing chamber containing larvae and said liquid volume;
   directing artificial light rays to a station in said first chamber which is distal to means separating one chamber from the adjacent chamber to thereby induce migration of the larvae to a distal station in the area of said directed artificial light;
   opening a communicating path in said separating means between said adjacent rearing chambers;
   directing artificial light rays proximal to said separating means in said first chamber to thereby induce migration of larvae toward said open communicating path; and
   directing artificial light rays into a darkened adjacent rearing chamber to induce migration of larvae from said first transfer chamber, through said open communicating path, and into said adjacent chamber.
2. A method for rearing crustaceans which includes the steps of claim 1 above, and the further step of darkening a portion of said first chamber distal to said separating means to induce further larval migration towards said open communication path.

TABLE II.—"PINK SHRIMP"

| Days | Time | Stage | Temperature, °C. | Food | Remarks |
|---|---|---|---|---|---|
| 0 | 2300 | Egg | 30.0 | | |
| 1 | 0915 | | 29.0 | | |
|   | 1100 | 1st naupilus | 29.5 | | |
|   | 1145 | | | | |
|   | 1645 | | 30.0 | | |
| 2 | | | | | |
| 3 | 0800 | 1st Protozoea | 30.5 | 200 dr. wardleys | |
|   | 1230 | | | | |
|   | 1800 | | 30.6 | | Transfer. |
| 4 | 0745 | | 30.0 | 125 dr. wardleys | |
|   | 1245 | 1st Protozoea | 30.0 | | |
|   | 1900 | | | | Transfer. |
| 5 | 1030 | 2d Protozoea | 30.0 | | |
|   | 1200 | | 30.0 | 200 dr. wardleys | |
|   | 1730 | | 29.5 | 50 dr. wardleys | |
|   | 2345 | | 30.0 | | Transfer. |
| 6 | 1230 | 2d Protozoea | 29.5 | | |
|   | 1500 | | 30.0 | | |
|   | 2000 | | 30.0 | | |
|   | 2015 | | 30.0 | | Transfer. |
| 7 | 1230 | 2d Protozoea | 30.0 | 100 dr. wardleys | |
|   | 1515 | do | 30.0 | | |
|   | 2100 | do | 30.0 | 100 dr. wardleys | Transfer. |
|   | 2245 | | | | Transfer. |
| 8 | 1230 | 3d Protozoea | 30.0 | 50 dr. wardleys | |
|   | 2315 | | 30.0 | | |
| 9 | 2100 | | 30.0 | 100 dr. wardleys | |
| 10 | 1215 | 1st Mysis | 30.0 | Live brine shrimp | |
| 11 | | | | | |
| 12 | | | | | |
| 13 | 1200 | 3d Mysis | 30.0 | Live brine shrimp | |
| 14 | 1230 | 1st Post Larvae | 30.0 | Live brine shrimp | |
|   | 2300 | | | | |

3. A method for rearing crustaceans which includes the steps of claim 1 above and which further includes the steps of:
substantially darkening said first chamber;
directing a plurality of separated light rays into said substantially darkened first chamber; and
aligning said plurality of separated light rays with a plurality of separated and open communicating paths to induce migration through said plurality of separated communicating paths.

4. A method of rearing crustaceans which includes the steps of claim 3 above, and which further includes the step of closing said first chamber to further light entry to thereby induce substantial transfer of the larvae into said lighted adjoining transfer chamber.

5. A method of rearing crustaceans which includes the steps of claim 4 above, which further includes the step of removing the liquid volume from said first chamber following substantial transfer of the larvae to said adjoining chamber, and replenishing said first chamber with fresh volumes of liquid compatible for rearing said crustaceans.

6. A method of rearing crustaceans which includes the steps of claim 5 above, and which further includes the steps of:
effecting successive transfers of larvae from one chamber to a separated adjoining chamber having fresh volumes of liquid compatible to the rearing of larvae; and
effecting such successive transfers a sufficient number of times until a desired post larval growth has been attained.

7. A method for rearing crustaceans which includes the steps of claim 1 above, and which further includes the steps of:
depositing a gravid female phototropic Decapoda crustacean in said first rearing chamber, and removing said female crustacean following the laying of eggs;
areating said temperature controlled liquid volume in said first rearing chamber until said eggs have hatched, said larvae have attained a selected developmental stage and said liquid volume has become undesirably contaminated;
draining said contaminated liquid volume from said first rearing chamber following substantial transfer of the larvae to the adjoining rearing chamber, and replenishing said first rearing chamber with fresh liquid volumes compatible for rearing the crustacea;
draining said adjoining chamber following retransfer to the first rearing chamber, and replenishing said adjoining chamber with fresh liquid volumes compatible for rearing the crustacea; and
continuing the sequential transfer of larvae to a freshly replenished liquid volume until the larvae growth has attained a selected stage of development.

8. A method for rearing crustaceans which includes the steps of claims 7 above, and which further includes the steps of:
introducing temperature controlled sea water as the liquid volume in the rearing chambers;
filtering said sea water before introduction into said chambers; and
providing dark-light areas within said chambers from the bottom of such chambers towards the top of such chambers to further induce movement of the crustacea to the upper levels of said rearing chamber.

9. A method for rearing cructacea which includes the steps of claim 7 above, and which further includes the steps of:
depositing gravid female crustacean into said first rearing chamber, and constraining said crustacean within a limited area; and
allowing the laid eggs to pass out of said constrained limited area so that the eggs escape predatory attack by the female pink shrimp.

10. An apparatus for rearing crustacea to at least the early postlarval stage including, in combination:
a tank, a plurality of open top chambers within said tank, partition means separating one chamber from another chamber, closable communicating passageways in said partition means;
means to remove liquid from each of said chambers in said tank;
means to desirably control the temperature of the liquid in each of said chambers of the tank;
an incubator hood mountable on top of a chamber, spaced sources of artificial light mounted within said hood, first light source being mounted proximal to the partition means separating the chamber having the mounted incubator hood from an adjoining chamber, and another light source distal to said partition; and
means to selectively actuate such spaced light sources to sequentially induce migration of the larvae away from the partition means and towards the partition means.

11. An apparatus for rearing crustacea which includes the elements of claim 10 above, and further includes a transfer cover mountable on the open top of a chamber, said cover positionable to completely cover the open top of the chamber, and said cover having a plurality of spaced and openable ports along a side of said cover, each of said openable ports being alignable with an openable communicating passageway in the partition means when said transfer cover is positioned to cover the top of an open chamber.

12. An apparatus for rearing crustacea which includes the elements of claim 11 above, wherein each of the plurality of communicating passageways in the partition means has a removable closure which stops migration of larvae from one chamber to another when in place, and which permits such migration when removed.

13. An apparatus for rearing crustacea which includes the elements of claim 12 above, wherein the openable ports in the transfer cover are a plurality of cutouts positioned along one edge of the transfer cover, and said cutouts are covered and uncovered by a removable trap door.

14. An apparatus for rearing crustacea which includes the elements of claim 13 above, wherein the floor and the lower major areas sidewalls the side are black, and the upper minor areas of the inside walls are of contrasting light color.

15. An apparatus for rearing crustacea which includes the elements of claim 10 above, and which further includes a plurality of air lines within each chamber, means at the end of each line to diffuse air into the liquid body within the chamber, and means to deliver air under pressure into said lines.

16 An apparatus for rearing crustacea which includes the elements of claim 15 above, wherein said air lines pass through the top of said incubator hood into the chamber covered by said hood, and flexible lines convey air under the pressure from the air pressure source to the lines mounted in the top of the incubator hood.

17. An apparatus for rearing crustacea which includes the elements of claim 10 above, wherein said incubator hood has a transparent sidewall, and means in said hood to allow access into the chamber of the tank upon which said hood is mounted.

18. An apparatus for rearing crustacea which includes the elements of claim 17 above, wherein the spaced synthetic light sources are spaced elongated fluorescent tubes mounted to the underside of the top wall of the hood.

19. An apparatus for rearing crustacea which includes the elements of claim 10 above, and which further includes heat conducting conduits in each chamber, said conduits connected to sources of hot and cold fluid, and means to sense the temperature of the liquid volume within a chamber and to control the flow of the desired fluid within the heat conducting tubes within the chamber.

20. An apparatus for rearing crustacea which includes the elements of claim 10 above, wherein:
a said tank has a pair of adjoining chambers;
a partition wall separating said chambers;
a plurality of communicating passageways at the upper part of said partition wall, each communicating passageway having a removable closure;
drain means at the bottom of each chamber to empty the body of liquid in said chamber following contamination and substantial migration of the larvae from that chamber to the adjoining chamber;

said incubator hood dimensioned to close the open top of one chamber when positioned thereon;

a transfer cover dimensioned to close the open top of the adjoining chamber; and said transfer cover having a plurality of open ports along one edge thereof, each of said ports being aligned with a communicating passageway when said transfer cover is mounted to fully cover the open top of said chamber.

21. An apparatus for rearing crustacea which includes the elements of claim 20 above, wherein the inside floor and the inside walls of each chamber are painted black except for an upper minor portion which is a contrasting light color.

22. An apparatus for rearing crustacea which includes the elements of claim 21 above, wherein a pair of elongated fluorescent tubes are mounted to the inside top wall of each hood, and wherein each bulb is separately actuated to selectively light any and both fluorescent tubes.

23. An apparatus for rearing crustacea which includes the elements of claim 22 above, wherein opposite sidewalls of the incubator hood are resilient transparent plastic sheets which are displaceable to allow access through said hood into the tank, and which sheets are resiliently urged to close the opposite sides of said hood.